United States Patent [19]
Jacobsz

[11] 3,764,821
[45] Oct. 9, 1973

[54] BRIDGE OPERATED LATE-PHASE FIRING CIRCUIT MEANS FOR FUEL BURNERS

[76] Inventor: Roelof F. Jacobsz, 11010 Quincy Blvd. N.E., Blaine, Minn. 55434

[22] Filed: May 17, 1972

[21] Appl. No.: 254,116

Related U.S. Application Data

[62] Division of Ser. No. 105,396, Jan. 11, 1971, abandoned.

[52] U.S. Cl.................. 307/139, 307/133, 307/143
[51] Int. Cl. .............................................. H01h 7/16
[58] Field of Search.................... 307/141, 139, 140, 307/143, 133, 125, 130, 131, 112, 117; 431/18, 66, 78; 340/248

[56] References Cited
UNITED STATES PATENTS
3,488,514   1/1970   Lundberg............................ 307/117

*Primary Examiner*—Herman J. Hohauser
*Attorney*—Lamont B. Koontz et al.

[57] ABSTRACT

A control system is provided for energizing an electrical load, in the form of a spark ignition transformer, so that the load is energized for a portion of each cycle of the applied alternating current in a first version, whereas, the load can be energized for a portion of each half cycle of the applied alternating current voltage in a second version. The control circuit utilizes a bridge configuration that is connected by a fuel burner control system to a source of alternating current. The bridge has an energy storage means in the form of a capacitor paralleled by a Zener diode in one leg for storage of energy during the initial rising portion of the applied alternating current voltage. When a fixed voltage has been reached, late in the applied voltage wave form, a programmable unijunction transistor is triggered into conduction and through a pulse transformer causes a solid state switch to become conductive through the primary spark ignition transformer for the fuel burner system.

5 Claims, 3 Drawing Figures

INVENTOR.
ROELOF F. JACOBSZ
BY Alfred N. Feldman
ATTORNEY.

BRIDGE OPERATED LATE-PHASE FIRING CIRCUIT MEANS FOR FUEL BURNERS

CROSS REFERENCE TO RELATED APPLICATIONS

This is a Division, of application Ser. No. 105,396, filed Jan. 11, 1971 now abandoned.

The present application is an improvement of the United States patent application, Ser. No. 21,570, filed on Mar. 23, 1970 in the name of Balthasar H. Pinckaers and assigned to the assignee of the present invention.

BACKGROUND OF THE INVENTION

The present invention has particular utility in fuel burners where a spark ignition is desired for operation such as is disclosed in U.S. Pat. No. 3,380,796, issued on Apr. 30, 1968 to A. D. Kompelien and U.S. Pat. No. 3,488,514, issued on Jan. 6, 1970 to J. E. Lundberg. Both of the above-noted United States patents disclose fuel burner systems that utilize ignition systems different than that disclosed in the present application, but the circuit of the present application could be readily adapted to be used in the type of circuit disclosed in these two patents.

When circuits for firing solid state power switches, such as the silicon controlled rectifier and Triac, are applied to step-up tranformers for spark ignition, a problem arises in controlling the power to the primary of the transformer in order to make the transformer design practical. As a result of this, it is desired to be able to apply only a selected amount of power to the primary for a short period of time, and this requires phased firing of a silicon controlled rectifier or Triac only for a selected portion of the applied voltage. In order to accomplish this, a circuit must be provided which is capable of disregarding the initial rise of the applied wave form, but this is quite difficult as most circuits are responsive to the voltage and therefore are not directly applicable to this type of control.

SUMMARY OF THE INVENTION

The present invention is directed to a late phase firing circuit that is capable of ignoring or disregarding the rising voltage portion of the applied wave form to a power switch, such as a silicon controlled rectifier or Triac, yet which responds to a predetermined voltage which occurs after the peak of the wave form. This is accomplished by providing a bridge configuration with the input of the bridge connected to the alternating current voltage wave form, while the output of the bridge is connected to a programmable switch means, shown as a programmable unijunction transistor. One leg of the bridge contains an energy storage means in the form of a capacitor that slowly charges as the voltage rises. The slowly rising charge on the capacitor does not allow the programmable unijunction transistor to conduct until the voltage on the programmable unijunction transistor is on the downward portion of the applied voltage wave form. The conduction of the programmable unijunction transistor occurs rapidly to discharge the energy storage means or capacitor through a pulse transformer into the gate of a power switch in the form of a silicon controlled rectifier or Triac, which then conducts through the primary winding of a spark ignition transformer.

The bridge circuit can be stabilized so that it is unaffected by variations in the magnitude of the applied alternating current voltage wave form by providing a Zener diode or other voltage breakdown means across the energy storage means portion of the bridge. The sequence of firing can be accomplished on every other half cycle by providing a half wave rectified alternating current voltage to the device, or can be provided on every one half cycle by providing a full wave rectified but unfiltered alternating current voltage to the bridge means.

DESCRIPTION OF THE PREFERRED EMBODIMENTS

Figure 1:
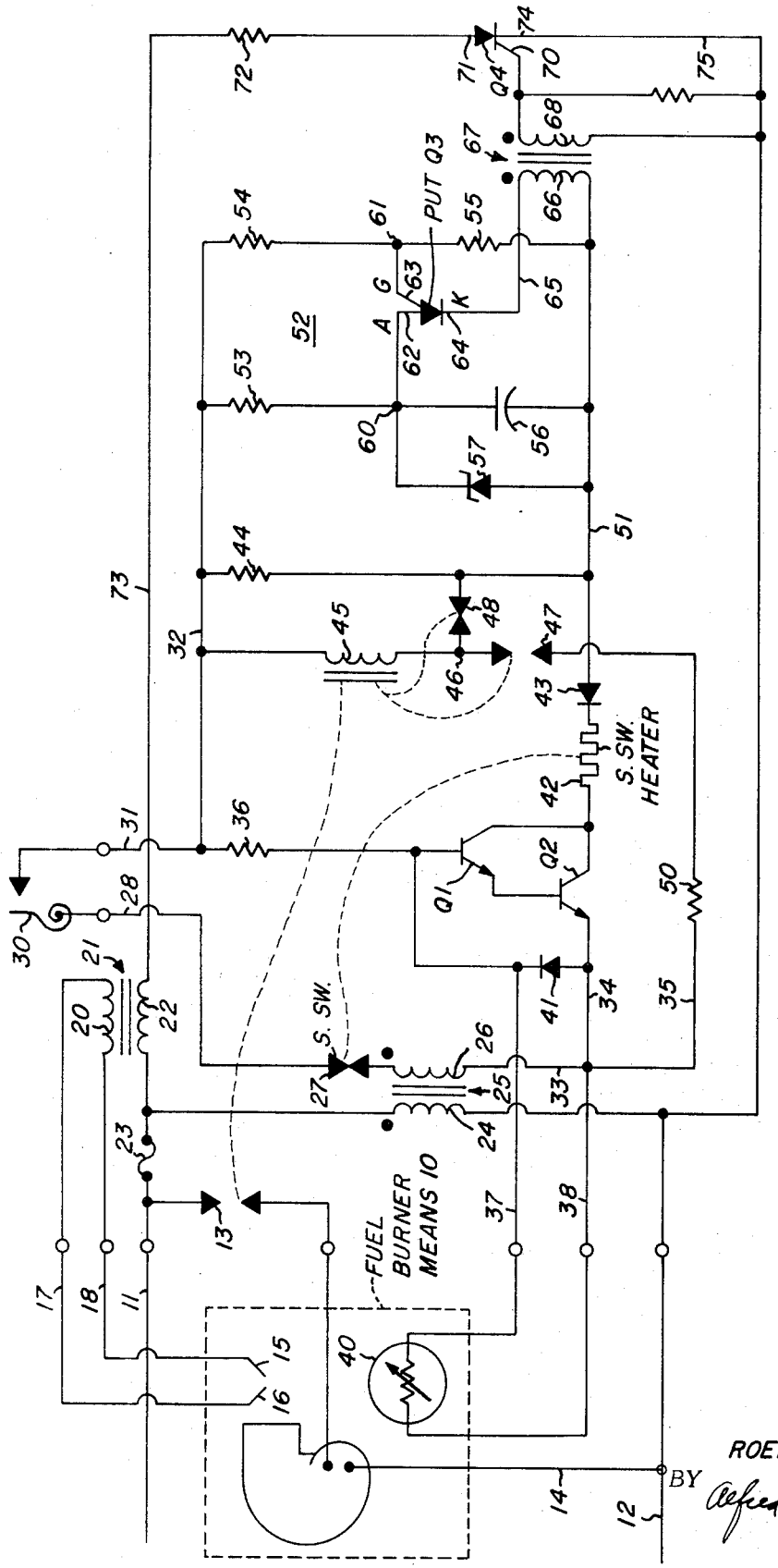
FIG. 1 is a schematic representation of a fuel burner means and a complete solid state electronic system therefor including the novel bridge means for control of a programmable unijunction transistor for generation of the necessary spark.

Disclosed in FIG. 1 is a complete solid state primary type of control system including the fuel burner means 10 which is energized from conductors 11 and 12 through a relay contact 13 that is normally open. A conductor 14 connects the input conductor 12 to the fuel burner means 10 so that when the relay contact 13 is closed an alternating current voltage is supplied from the conductors 11 and 12 to the fuel burner means 10 for operation in a conventional manner. The fuel burner means 10 further includes a pair of spark electrodes 15 and 16 which are connected by conductors 17 and 18 to a secondary winding 20 of a spark transformer generally shown at 21. The primary 22 of the spark transformer 21 is connected through a fuse 23 to the line 11 and is included in the solid state circuitry that will be described in detail subsequently.

Connected between the fuse 23 and the conductor 12 is a transformer primary winding 24 of a step down transformer generally shown at 25 which has a secondary winding 26. The stepdown transformer 25 is a conventional control transformer to supply a relatively low voltage to the solid state circuitry. The secondary winding 26 is connected through a safety switch contact 27 to a conductor 28 which in turn is connected to a thermostat generally shown at 30. A further conductor 31 connects the thermostat 30 to a conductor 32 that supplies an alternating current voltage to the solid state circuitry under control.

The secondary winding 26 has a further conductor 33 that separates into two branches 34 and 35 to form part of a connection means for the bridge circuit that will be described subsequently and which is the central portion of the invention. Connected between the conductor 32 and the conductor 34 is a resistor 36 and a pair of conductors 37 and 38. The conductors 37 and 38 are connected to a photocell 40 in the fuel burner means 10. The photocell 40 can be of any type, such as a cadmium sulfide cell or ultraviolet detector, for sensing a flame at the fuel burner means 10 for control of the solid state primary circuit. When the photocell 40 is exposed to a dark ambient atmosphere, its resistance is relatively high, but when flame is present its resistance drops to a relatively low value. The value of the resistance of the photocell 40 along with the resistor 36 forms a voltage divider network with the photocell 40 paralleled by a diode 41, and a pair of transistors Q1 and Q2 acting as a switch. When the photocell 40 is at a high resistance level, the switch is turned " on," but when the photocell 40 sees a flame, its resistance drops to a sufficiently low value to effectively turn "off" the switch made up of transistors Q1 and Q2.

The switch made up of transistors Q1 and Q2 connects a safety switch heater 42 and a diode 43 along with the resistor 44 to the conductor 32 to supply a conduction path for current through the safety switch heater 42 when the thermostat 30 closes and the photocell 40 is in a dark ambient. A relay 45 is connected from conductor 32 to a junction 46 to a pair of relay contacts 47 and 48. The contact 48 is a normally closed contact of the relay 45 and completes an initial energizing circuit for the relay 45. The contact 47 is a normally open contact of relay 45 and closes through a resistor 50 to latch the relay 45 into operation through the conductor 35 when the system is operative.

A common conductor 51 is provided to the diode 43 and the normaly closed contact 48 of relay 45 and forms along with conductor 32 an input means for a bridge means generally shown at 52. The bridge means 52 forms the heart of the present invention and includes a pair of resistors 53 and 54 as two legs of the bridge along with resistor 55 and an energy storage means 56 as the other two legs of the bridge. The energy storage means 56 is shown as a capacitor and in the present circuitry is disclosed as being paralleled by a voltage breakdown means 57 in the form of a Zener diode. The output means for the bridge means 52 is at junctions 60 and 61 and voltage across these points varies as the applied voltage between the conductors 32 and 51.

Connected between the junctions 60 and 61 is a programmable switch means Q3 disclosed as a programmable unijunction transistor with an anode 62 connected by a conductor to the junction 60 with the gate 63 connected to the junction 61. The cathode 64 of the programmable unijunction transistor Q3 is connected through conductor 65 to the primary winding 66 of a pulse transformer generally shown at 67. Th secondary 68 of the pulse transformer 67 is connected to a gate 70 of a silicon controlled rectifier Q4. The anode 71 of the silicon controlled rectifier Q4 is connected through a resistor 72 to a conductor 73 then in turn is connected to the primary winding 22 of the step-up or spark ignition transformer generally shown at 21. The cathode 74 of the silicon controlled rectifier Q4 is connected to a conductor 75 which in turn is connected back to conductor 12 of the alternating current voltage supply for the system.

OPERATION OF FIGURE 1

Upon a need for the operation of the fuel burner means 10, the thermostat 30 closes and with power supplied on conductors 11 and 12 the transformer 25 supplies power to the transformer winding 26. Current flows through the safety switch 27 and the thermostat 30 to conductor 32. Current then flows through the relay 45 and the normally closed contact 48 of that relay. This current then flows through the diode 43 and the safety switch heater 42, checking the continuity of the heater as part of the pull-in path for the relay 45. Current flows through the switch means made up of transistors Q1 and Q2 which conduct current back to conductor 34 and the secondary 26 of transformer 25. When the relay 45 thus has a current flowing in it, it closes the contacts 47 and 13. The contact 47 latches the relay 45 into operation and the closing of the contact 13 supplies energy to the fuel burner means 10 so that a valve and blower, in the case of an oil burner, or a valve in the case of a gas burner is made operative. At the same time the photocell 40 is dark and the resistance across the photocell is high so the switch made up of transistors Q1 and Q2 can conduct freely.

Under the conditions described above, a pulsating voltage is supplied on conductors 32 and 51 to the bridge means 52. Current flows through the resistors 54 and 55 which form a voltage divider network on one side of the bridge means 52. A current flows through the resistor 53 slowly charging the energy storage means or capacitor 56 but the charge on the capacitor 56 is limited to the point at which the Zener diode 57 breaks down. This breakdown occurs prior to the voltage between anode 62 and gate 63 of the programmable unijunction transistor Q3 reaching a conduction point for the transistor Q3. The voltage appearing across the capacitor 56 is held sufficiently low so as to keep the voltage on the anode 62 below the gate 63 of Q3 until the voltage starts to fall across the conductors 32 and 51. When the voltage on conductors 32 and 51 falls to the level equal to the voltage on the capacitor 56, the anode to gate voltage, that is the voltage between points 62 and 63 are equal, the programmable unijunction transistor Q3 goes into conduction with the anode 62 to cathode 64 discharging the capacitor 56 rapidly through the primary winding 66 of the pulse transformer 67. A voltage is developed across the secondary winding 68 at the gate 70 of the silicon controlled rectifier Q4 driving the silicon controlled rectifier Q4 into conduction. Thus conduction occurs through the primary winding 22 of the spark generating transformer 21 and the resistor 72, which limits the current to an acceptable level, through the silicon controlled rectifier Q4 and back to the line 12. This conduction occurs late in the cycle of the applied alternating current voltage thereby limiting the current flow to a level acceptable in the transformer 21.

The sudden flow of current in the primary winding 22 of transformer 21 causes a voltage to be generated in the secondary winding 20, and across the electrodes 15 and 16 a spark is generated which ignites fuel issuing in the fuel burner means 10. A spark is generated on every other half cycle of the applied alternating current voltage.

As soon as a flame is present in the fuel burner means 10, the photocell 40 drops in resistance value to a low enough level to effectively turn "off" the switch made up of transistors Q1 and Q2. This removes the current flow through the safety switch heater 42 and through the initial pull-in path for the relay 45. The generation of a spark by operation of bridge means 52 also ends. The relay 45 remains energized through the holding contact 47 until energy is removed from the overall circuit by the opening of the thermostat 30.

It can thus be seen that with the present arrangement a simple bridge means utilizing a programmable switch means and an energy storage means is capable of triggering a power switch means late in the applied alternating current voltage wave form for generation of a spark in a fuel burner means.

DESCRIPTION OF FIGURE 2

Figures 2, 3:
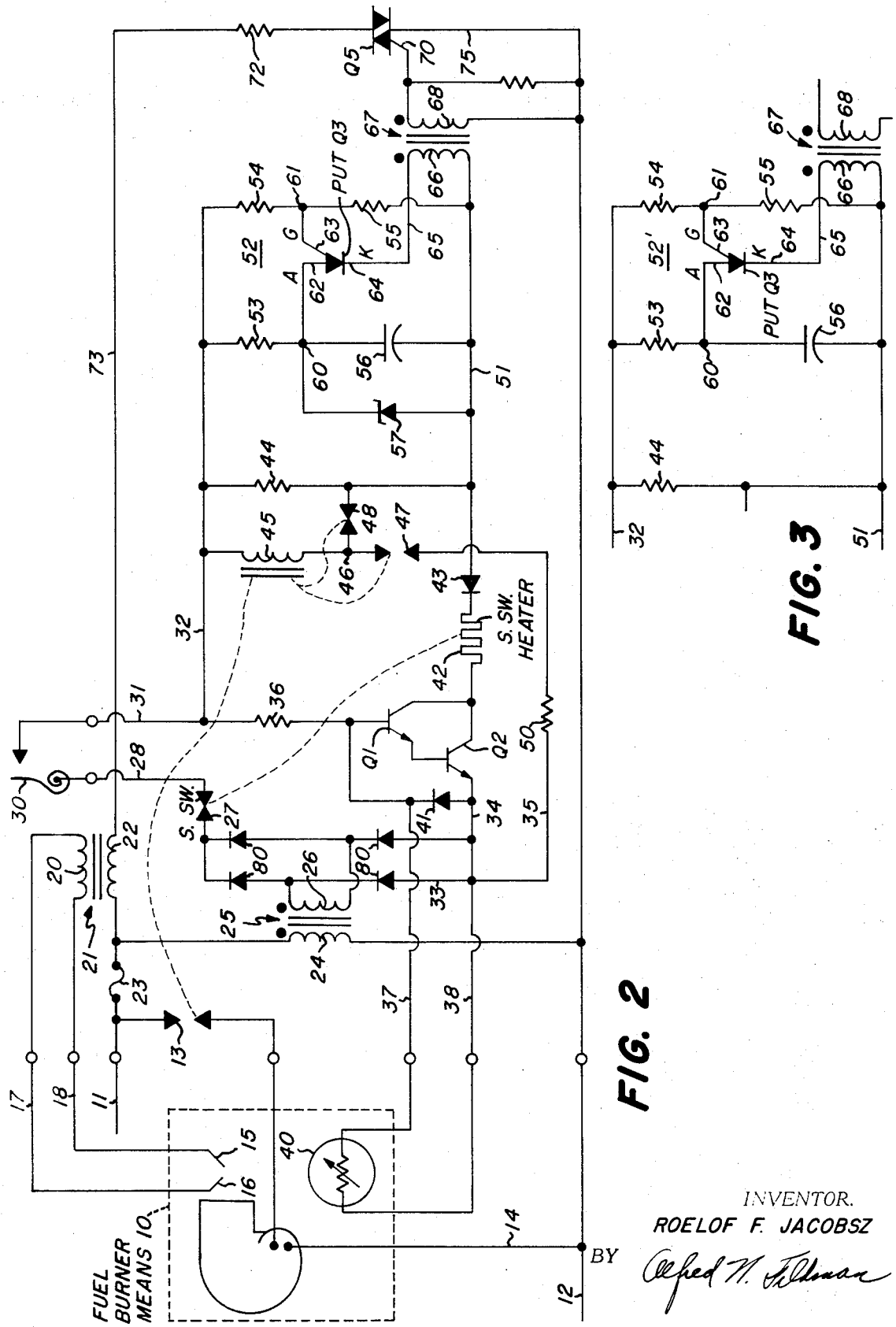
FIG. 2 is a similar disclosure of a fuel burner means wherein the power switch means is a Triac, and the input includes a full wave rectifier for firing the Triac on every half cycle of the applied wave form.
FIG. 3 is a very highly simplified form of just the bridge means portion of the circuit in its most elementary form.

FIG. 2 is generally the same as FIG. 1 with certain minor changes. The same reference numerals will be used for the similar parts of those figures and it will be noted that the silicon controlled rectifier Q4 has been replaced by a Triac Q5. The Triac Q5 is a powder switch means capable of conducting in both directions when its gate 70 is supplied with a pulse of energy from the secondary winding 68 of transformer 67. In order to take advantage of this bidirectional current flow characteristic of the TRIAC Q5, the secondary winding 26 of the control transformer 25 has had added to it four diodes 80 in a full wave bridge configuration so that the potential supplied to the safety switch 27 and thermostat 30 to conductors 32 along with conductor 51 is a full wave rectified, but unfiltered, voltage. In this case the voltage rises and falls equally on each one half cycle and bridge means 52 is triggered into operation each half cycle rather than on alternate half cycles. The balance of the operation of the circuit of FIG. 2 is identical to that of FIG. 1 and will not be described in any further detail.

DESCRIPTION OF FIGURES

In FIG. 3 a highly simplified portion of FIGS. 1 and 2 is disclosed as including only the bridge means 52'. This bridge means 52' differs from the previously described bridge means in that the Zener diode 57 of FIGS. 1 and 2 have been omitted and only the resistors 53, 54, 55, and the energy storage means 56 has been disclosed along with the programmable unijunction transistor Q3. Also the primary winding 66 of the pulse transformer 67 has been disclosed.

It is quite obvious that this circuit is substantially the same as that disclosed in the portion of FIGS. 1 and 2 with the exception of the removal of the Zener diode 57. The removal of the Zener diode allows the energy storage means 56 to continue to follow the applied voltage wave form as the voltage rises and falls. The resistance values 53, 54, and 55 are selected along with the size of the capacitor 56 so that the rise in voltage is delayed sufficiently so that the anode 62 of the programmable unijunction transistor Q3 does not reach the gate voltage at 63 on the rising portion of the applied wave form. The voltage at the gate 63 of the programmable unijunction transistor Q3, however, drops sufficiently rapidly to reach the voltage applied to the anode 62 that has been previously stored during the rising portion of the wave form on the energy storage means or capacitor 56. At this point the programmable unijunction transistor Q3 goes into conduction and discharges the capacitor 56 through the anode 62 to the cathode 64 of the programmable unijunction transistor Q3 through the primary winding 66 to provide the necessary spark for igniting the fuel in a fuel burner means 10 of FIGS. 1 and 2.

The circuitry of FIGS. 1 and 2, which utilize the voltage breakdown means or Zener diode 57 have the advantage of being voltage stable as line voltage applied to the system changes. The device disclosed in FIG. 3 has a tendency to vary due to the fact that it lacks the Zener diode 57 but it still provides an acceptable triggering mechanism where voltage fluctuations are no great problem of where the spark generation in the spark transformer 21 is less critical than in the applications disclosed in FIGS. 1 and 2. There are other variations of the bridge means 52 and 52' which could be adapted to use a programmable switch means for a triggering mechanism for a power switch means to control the energy flow in a spark generating transformer. For this reason the applicant wishes to be limited in the scope of his invention solely by the scope of the appended claims.

The embodiments of the invention in which an exlcusive property or right is claimed are defined as follows:

1. Switching circuit means for controlled operation of power switching means after the passing of the peak of an applied alternating current voltage to the power switching means for a fuel burner, including; power switching means having control means for operating said switching means; transformer means including primary and secondary means with said secondary means connected to said control means to control the conduction of a current through said switching means; bridge means having input means and connection means including rectifier means and a pair of terminals adapted to be connected through a thermostat for connecting said input means of said bridge means to said alternating current voltage; said connection means further including current control means adapted to be controlled in response to a flame detector at said fuel burner; output means for said bridge means with said output means including programmable switch means with said programmable switch means controlled by said output means; said programmable switch means being further connected to said primary means of said transformer means; and energy storage means connected in a leg of said bridge means to delay the conduction of said programmable switch means by storing energy in said energy storage means upon the application of said alternating current voltage until an output voltage in said bridge means causes said programmable switch means to conduct the stored energy through said transformer primary means to operate said power switching means late in the cycle of said applied alternating current voltage.

2. Switching circuit means for controlled operation of power switching means after the passing of the peak of an applied alternating current voltage to the power switching means for a fuel burner as described in claim 1 wherein said energy storage means is capacitor means and further includes a parallel zener diode; and said power switching means is solid state power switch means.

3. Switching circuit means for controlled operation of power switching means after the passing of the peak of an applied alternating current voltage to the power switching means for a fuel burner as described in claim 2 wherein said programmable switch means is a programmable unijunction transistor; and said solid state power switch means is connected through ignition transformer means to a source of power.

4. Switching circuit means for controlled operation of power switching means after the passing of the peak of an applied alternating current voltage to the power switching means for a fuel burner as described in claim 3 wherein said bridge means connection means includes full wave rectifier means and said solid state power switching means is a triac.

5. Switching circuit means for controlled operation of power switching means after the passing of the peak of an applied alternating current voltage to the power switching means for a fuel burner as described in claim 3 wherein said solid state power switching means is a silicon controlled rectifier.

* * * * *